United States Patent Office 2,713,246
Patented July 19, 1955

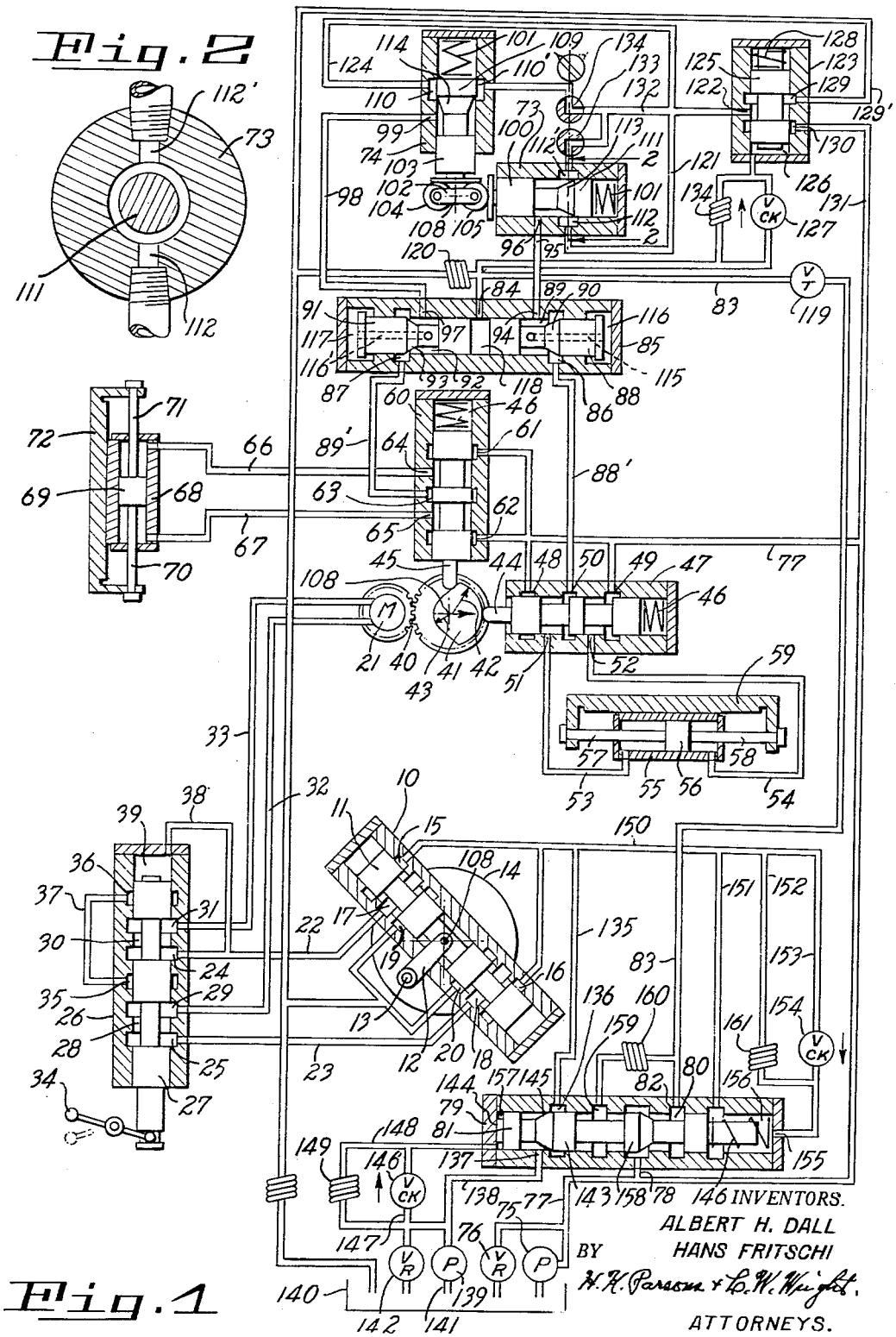

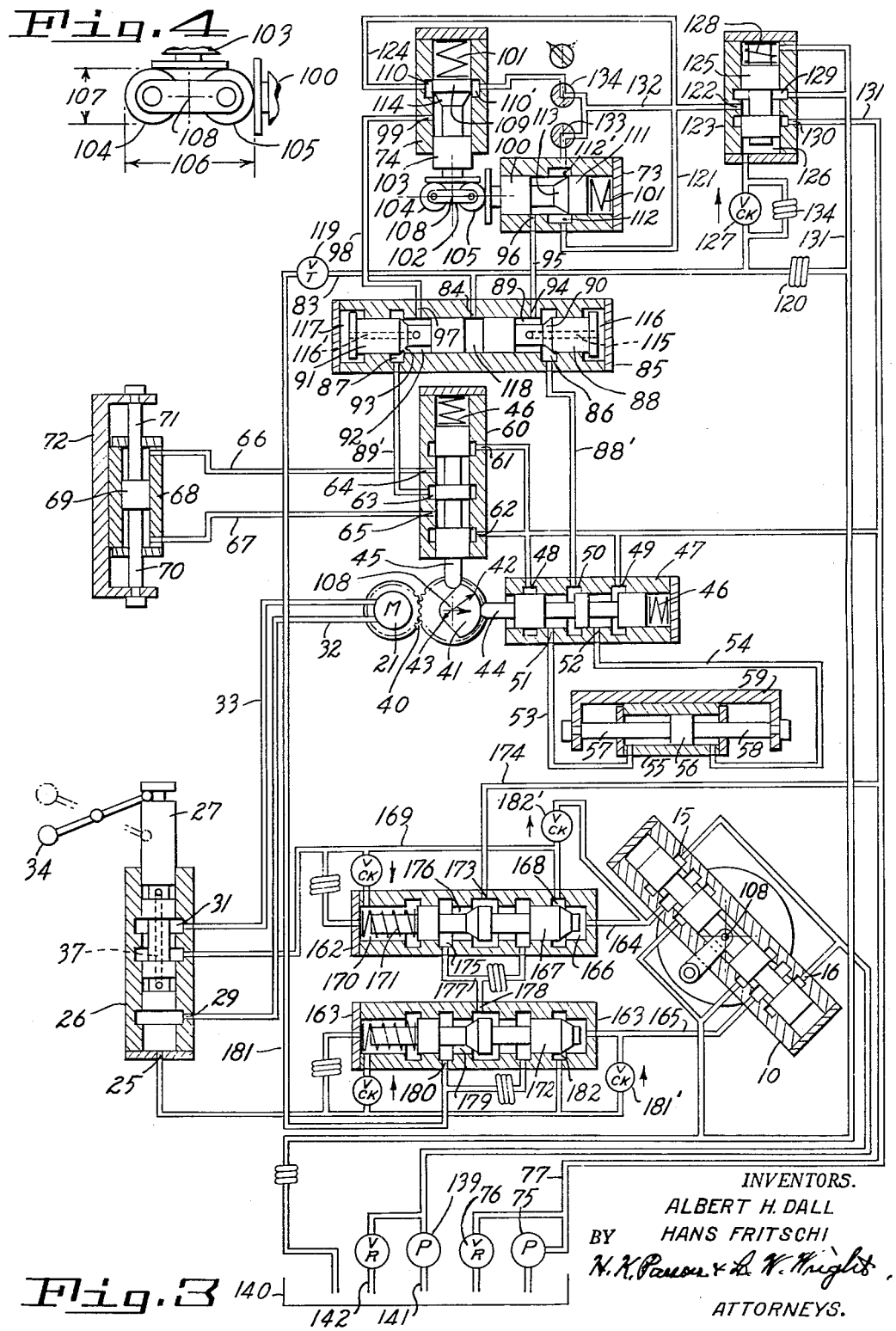

2,713,246

TRACER CONTROL MECHANISM HAVING INDEPENDENT RATE AND DIRECTION CONTROL

Albert H. Dall, Cincinnati, and Hans Fritschi, Amberley Village, Ohio, assignors to The Cincinnati Milling Machine Co., Cincinnati, Ohio, a corporation of Ohio Application December 1, 1953, Serial No. 395,498

15 Claims. (Cl. 60—97)

This invention relates to new and improved tracer controlled circuits for use in automatic profiling machines and the like for governing the direction of the cutting path in conformity to a master.

One of the problems that hamper high production rates in automatic profiling machines is that of automatically obtaining a wide variation in feed rates, in addition to automatically controlling the direction of the feeding path. To produce a machine which is universally adaptable to all conditions requires that a wide variation in feed rate be available because the sharper the turn or change in direction of the cutting path, the slower the feed rate should be in order to prevent the momentum of the heavy moving slides from overrunning and causing inaccuracies in the shape being produced with respect to a master or pattern. Since the rate of change of the feed rate, if plotted, does not follow the same contour as the rate of change of direction for a given profile being traced, a single moving control member such as a tracer finger cannot satisfactorily govern both changes.

Profiling operations of the character under consideration herein require two power operable movers in order to accomplish universal movement in a plane between a tool and a work piece, and the direction of the resultant cutting path is the resultant of the rates of movement of the two movers and this resultant rate is substantially constant. In the past, no satisfactory arrangement was available for automatically changing this constant feed rate independent of the proportioning or direction determining and therefore a low feed rate was used which would take care of the worst conditions.

This invention contemplates a mechanism wherein the direction determining function is separated from the feed rate determining function to the extent that the quantity of change of each may be different but both controlled from a single member, the tracer. In addition, the rate change is automatically effected just prior to the direction change.

One of the objects of this invention is to obtain automatic variation of the feed rate along with variation in direction and both controlled from a single tracer.

Another object of this invention is to provide a tracer controlled mechanism which will effect a reduction in feed rate momentarily before effecting a change in direction.

A further object of this invention is to provide an improved control for hydraulically operated profiling machines wherein separate valves are provided for determining the direction and the rate so that the controlling movements of one valve may be greater or less than the controlling movements of the other valve whereby better overall control may be obtained.

Still another object of this invention is to provide a new and improved hydraulic tracer control circuit for varying the feed rate of a profiling operation independent of the direction determining mechanism, so that the feed rate may be reduced each time before a change in dirction is to be made.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a diagram of an improved hydraulic control circuit embodying the principles of this invention.

Figure 2 is a detail section on the line 2—2 of Figure 1.

Figure 3 is a modification of the hydraulic control circuit shown in Figure 1.

Figure 4 is an enlarged view of a camming device used in both embodiments of the invention.

Referring to the drawings, and more particularly to Figure 1, the reference numeral 10 indicates a tracer valve having a valve plunger 11 which is moved therein by a crank arm 12 attached to a shaft 13 which is journaled in a rotatable tracer head, indicated generally by the reference numeral 14. This rotatable tracer head and tracer valve is similar in construction and operation to that shown in copending application, Serial No. 288,806, filed May 20, 1952, and further description thereof is not believed to be necessary, it being understood that deflection of a tracer finger will cause movement of the crank arm 12 and thereby cause movement of the tracer valve plunger 11 in direct relation to movement of a tracer finger.

This tracer valve has pressure ports 15 and 16, motor ports 17 and 18, and reservoir ports 19 and 20. This tracer valve controls rotation of a hydraulic motor 21 which is connected to the motor ports in the following manner. Hydraulic channels 22 and 23 extend from the motor ports to ports 24 and 25 of a selector valve interposed between the tracer valve and the motor to select between automatic operation and manual control. The selector valve 26 has a valve plunger 27 which is shown in its automatic control position wherein the port 25 is connected by the annular groove 28 to port 29, and port 24 is connected by the annular groove 30 to port 31. Hydraulic channels 32 and 33 extend from the ports 29 and 31 to the motor 21. It will now be seen that any variation in the tracer valve plunger 11 from its neutral position will connect pressure to one of the channels 32, 33, and the other to reservoir, thereby causing rotation of the hydraulic motor 21.

By shifting the selector valve plunger 27 upward as viewed in Figure 1 through operation of the control lever 34, the annular groove 28 will connect port 29 to port 35, and simultaneously connect port 31 to port 36, which is interconnected by hydraulic channel 37 to port 35 whereby the lines 32 and 33 are short circuited, and thus the motor 21 may be rotated by hand without interference from the hydraulic pressure. Should the selector valve be in the manual position just described and fluid pressure enter channel 22 from port 15 with the port 24 closed, the hydraulic pressure will flow through channel 38 to chamber 39 of the valve 26 and push the plunger 27 thereof to its automatic position.

The mechanism described thus far comprising a tracer valve to control rotation of a hydraulic motor connected for rotation of a rotary tracer head with an automatic selector valve is well known in the art and disclosed in Patent 2,332,533, issued October 26, 1943.

In this invention, the cam structure is different from that shown in the patent. The hydraulic motor 21 is operatively connected through gearing 40 for rotation of a direction control cam 41. This cam has a large radius 42 and a small radius 43 for positioning reversing valve plungers 44 and 45 which are held in constant engagement with the periphery of the cam by springs 46 in either one of their extreme positions. The large and small cam portions, which are a little less than 180 degrees in extent, are connected by cross-over portions which operate to hold one valve or the other momentarily in a neutral or central position. It will be noted that most of the time the valves will be held in either one extreme direction determining position or the other, and that there is no attempt to throttle the flow through these valves and thereby vary the feed rate to any appreciable extent. They just determine direction.

The valve plunger 44 is held against the periphery of the cam by a spring 46, and the valve housing 47 which contains the spring has pressure ports 48 and 49, an exhaust port 50, and motor ports 51 and 52 which are connected by hydraulic channels 53 and 54 to opposite ends of a hydraulic cylinder 55. The hydraulic cylinder or motor has a piston 56 which is connected by oppositely extending piston rods 57 and 58 to a movable slide 59 of the machine.

Similarly, the valve plunger 45 is held against the periphery of the cam 41 by a spring 46 contained in the valve housing 60 which has pressure ports 61 and 62, an exhaust port 63, and motor ports 64 and 65 which are connected by hydraulic channels 66 and 67 to opposite ends of a hydraulic cylinder or motor 68. The hydraulic cylinder has a piston 69 which is connected by oppositely extending piston rods 70 and 71 to a second movable slide 72 of the machine.

It will be understood that one of these slides may be the work supporting slide and the other, the cutter supporting slide as is common practice in profiling machines, so that the combined movements of the two slides establish a cutting path.

In the position of the parts shown, the cam 41 holds the valve 44 in a wide open position and holds the valve 45 in a central or closed position. By rotating the cam 41 degrees in a clockwise direction from the position shown, it will be seen that the valve 44 still remains in a wide open position, and the valve 45 has been moved downward from its central position to an open position. On the other hand, by rotating the cam 41 degrees in a counterclockwise direction, the valve 44 is still in the same open position, but the valve 45 has been moved upward to an open position on the other side of its central position, thus reversing the flow through the valve. It should now be evident that rotation of the cam through an angle of 360 degrees will produce eight different combinations of positions of the two valves. In four of these positions both valves are open, which would produce a resultant movement at a 45 degree angle to the axis of movement of the two slides 59 and 72. Any variation from this direction in any of the four quadrants can only be obtained by varying the feed rates of the slides with respect to each other. This is accomplished by separate means comprising feed rate throttle valves 73 and 74 which operate on the return or exhaust flow from the ports 50 and 63 respectively of the reversing valves 47 and 60.

The pressure ports of the valves 47 and 60 are supplied with fluid from a pump 75 having a relief valve 76 connected to the delivery channel 77 of the pump which, in turn, is connected to the pressure ports 49, 48, 62, and 61. The pump is also connected through channel 77 to port 78 of a control valve 79, and this port is normally connected by means of an annular groove 80 in the valve plunger 81 of valve 79 to port 82. The port 82 is connected by channel 83 to port 84 of a balancing valve 85. The balancing valve has ports 86 and 87 which are connected by channels 88' and 89' to exhaust ports 50 and 63 respectively of the reversing valves 47 and 60.

The valve 85 contains a first plunger 88 in which is formed an annular groove 89 having a tapered shoulder 90 which is capable of movement relative to the port 86 to vary the resistance to fluid flow through the port and thereby determine the pressure drop across the valve. A second plunger 91 contained in the valve 85 has an annular groove 92 which has a tapered portion 93 which is capable of movement relative to the port 87 for varying the resistance to fluid flow therethrough and thereby the pressure drop. The valve 85 also has a port 94 connected by a channel 95 to port 96 of the throttle valve 73. A second port 97 is in constant communication with the annular groove 92 and is connected by channel 98 to port 99 of throttle valve 74. It will now be seen that the return fluid from port 50 of valve 47 will flow through channel 88', throttle port 86, annular groove 89 and port 94 of valve 85 to the port 96 through channel 95 of the throttle valve 73. Similarly, the fluid from port 63 of valve 60 will flow through channel 89', throttle port 87, annular groove 92 and port 97 of valve 85, and then through channel 98 to port 99 of the throttle valve 74.

The valves 73 and 74 are known as slit type throttle valves, and the valve 73 has a plunger 100 which is held by a spring 101 in engagement with a camming device 102. Similarly, the valve 74 has a plunger 103 which is held by a spring 101 in engagement with a camming device 102, but the valves are arranged with their axes in 90 degree relationship with respect to the axis of rotation of the camming device. The camming device could be in the form of an oval cam but to reduce friction it is comprised of two rollers 104 and 105, which are mounted side by side and of such diameter as to produce, see Figure 4, a long axis 106 and a short axis 107. Thus, upon rotation about the central axis 108, which represents the axis of the shaft that supports the cams, it will be seen that the plunger 103 will be moved in a direction to cause its valve spool 109 to open port 110 while the plunger 100 will move in such a direction as to cause its valve spool 111 to close port 112. As shown in Figure 2, the port 112 is merely a slot formed on one side of the valve bushing, and the valve plunger has a tapered spool 113 which is relatively movable with respect to the slot 112 to vary the resistance of fluid flow therethrough. The port 110 of valve 74 is also a slit type throttle, like the port 112, and the plunger 103 has a tapered spool 114 which is movable relative to the port to vary the resistance to fluid flow therethrough.

It will now be seen that the throttle valve plungers 100 and 103 are positioned mechanically by the camming device 102, and this sets up a relationship between the hydraulic resistance at the port 112 to the hydraulic resistance at the port 110, and except at the four crossover points throughout 360 degrees of rotation of the camming device 102 when the resistances at the two ports are the same, the hydraulic resistance of the ports will be inverse, that is, the resistance of one is greater and the other less with respect to the resistance at the crossover points. It is evident that the hydraulic resistances of ports 110 and 112 are mechanically set up. Considered now from a hydraulic viewpoint, the resistance of port 112, for instance, will create some predetermined pressure in the channel 95, and this pressure will be communicated through the annular groove 89 formed in the valve plunger 88 and through an interdrilled passage 115 in the plunger to the end chamber 116 of the valve 85 whereby this pressure will tend to urge the plunger toward the left and thereby increase the resistance to flow through the port 86. Similarly, the resistance to flow through the port 110 will create some predetermined pressure in channel 98 and thereby, through the interdrilled passage 116' in plunger 91, will create a pressure in chamber 117 at the other end of valve 85 to shift the plunger 91 toward the right and increase the resistance to flow through the port 87. Thus the plungers 88 and 91 are urged toward one another but the chamber 118, located between the ends of the plungers, is connected to port 84 and thereby is constantly supplied with fluid pressure from the pump 75 to oppose movement of the valve plungers toward one another.

It will now be apparent that the pressure in chambers 116 and 117 must be the same as the pressure in the chamber 118 in order to balance the pressures on the plungers and hold the plungers stable in any given position. The same pump directly or indirectly supplies all of these chambers but since some of the fluid pressure which goes through the two motor systems is utilized in doing work, the pressure in the channels 88' and 89' will necessarily be lower than the pressure in the channel 83. Therefore, to even up the pressure conditions a throttle valve 119 is inserted in the channel 83 to lower the pressure in the chamber 118. The channel 83 also has a resistance 120 in series with the throttle valve 119 but beyond the port 84 to obtain a hydraulic relationship of resistance "in" to resistance "out" as respects the chamber 118 whereby if the resistance of the valve 119 is equal to the resistance 120, the pressure in the chamber 118 will be equal to one-half of the pressure supplied to the valve 119.

By adjusting the valve 119 the pressure in the chamber 118 can be varied and can be set to a desired pressure which will operate satisfactorily in relation to the pressures in the chambers 116 and 117. It will be obvious that whatever pressure is set for chamber 118, the same balancing pressure must exist in the chambers 116 and 117 in order to stabilize the position of the valve plungers. Since the pressure in the chamber 118 is arbitrarily set, and the position of the slit type throttle valve is mechanically set, the valve plungers 88 and 91 are caused to automatically shift by the unbalance of the opposing end pressures thereon to such positions that will balance the pressures in the chambers 116 and 117 against the pressure in the channel 118. By the act of shifting, the valve plungers 88 and 91 readjust the pressure drops across the balancing valves to produce a pressure that will balance with the constant pressure in chamber 118. This does not mean that both plungers 88 and 91 take up the same position. Thus, if one of the throttle valves is wide open, its corresponding balancing valve plunger should be substantially the same to allow a large flow and a fast rate of its controlled slide, while the other throttle valve may be nearly closed, as well as its corresponding balancing valve, to effect a slow rate in the other slide. This would follow the hydraulic principle that if the resistance to the flow of incoming fluid to a space is equal to the resistance to flow out of that space, the pressure in the space would be equal to one-half of the pressure of the incoming fluid. It will now be seen that if the pressure in the channels 88' and 89' were assumed to be equal, and the throttle valve plunger 111 is wide open to produce a fast rate that the plunger 88 would have to be in substantially the same position, but, even although they are both substantially wide open, the resistance at port 86 would be equal to the resistance at port 112, and the pressure in chamber 116 would be equal to one-half of the pressure in the channel 88'. Similarly, even although the port 110 is substantially closed, and the port 87 is substantially closed, still the resistances of the two ports would be substantially the same, and therefore the pressure in the chamber 117 would be one-half of the pressure in the channel 89' and, as explained, would therefore be equal to the pressure in the chamber 116 whereby the plungers would be balanced.

It should now be evident that by readjusting the throttle valve 119 that the pressure in chamber 118 can be varied somewhat and thereby change the positions of the plungers 88 and 91 with respect to the same position of the throttle valves and thereby change the flow conditions without changing the proportion of the resistances, and thus obtain a variation in the feed rate.

The flow passing through the port 112 of throttle valve 73 is connected by a channel 121 to port 122 of a safety valve 123. Similarly, the fluid passing through the port 110 is connected by channel 124 to port 122. This valve has a plunger 125 which is normally held in the position shown by hydraulic pressure in the chamber 126 whereby the port 122 is connected to reservoir port 129 and return channel 129'. A spring 128 normally urges the valve plunger to a closed position wherein the port 122 would be disconnected from the port 129 and connected to pressure port 130. Thus, if for any reason the pressure should drop in the system, the plunger 125 will move downward and connect the port 122 to port 130 which is connected by a branch line 131 to the supply line 77 from pump 75. The throttle valves 73 and 74 have an additional slit type port opposite the ports referred to, and these are normally connected to a branch line 132 leading to port 122. The port 112' is connected by a rotatable disconnect valve 133 to line 132, and the port 110' is connected by disconnect valve 134 to line 132, and when it is desired to get a very slow feed rate the valves may be rotated to close these branch lines whereby all the flow must go through lines 121 and 124.

In order to prevent fluttering of the valve plunger 125, a resistance 134 is connected in parallel with the check valve 127 between pressure line 83 and chamber 126 which thereby helps to stabilize the pressure in chamber 126 so that any sudden momentary drop in pressure in the line 83 will not affect the valve.

The control valve 79 has a plunger 81 which is so connected in the circuit that it is responsive to the demand of the tracer valve for pressure fluid each time the tracer valve opens to cause operation of the hydraulic motor 21. Each such demand by the tracer valve causes shifting of the plunger 81 to automatically slow down the feed rate of the machine. In other words, each time the tracer valve opens, it is a signal that the direction of tracing is about to be changed and therefore it is desirable to slow the feed rate until the change in direction has been completed. This is accomplished by connecting the pressure ports 15 and 16 of the tracer valve by channel 135 to port 136 of valve 79. This valve also has a port 137 which is connected by channel 138 to the output of a pump 139 which withdraws oil from a reservoir 140 through a suitable intake 141. The pump has a relief valve 142 connected to its output for controlling the ultimate pressure in line 138.

The valve plunger 81 has a spool 143 which closes the port 136 when the plunger is in engagement with the end 144 of the valve housing 79. In fact, the parts are so made that the shoulder 145 on the valve spool does not quite close the port 136 so that the line 135 is equal to the pressure in line 138 when there is no flow. The pressure on the left end of the plunger 81 is supplied by the pump 139 through channel 147, a one-way check valve 146' and channel 148. A hydraulic resistance 149 is connected in parallel with the check valve 146' to allow return flow under operating conditions. The pressure in channel 135 is connected by a branch line 150 to the other end of the valve housing 79 through three branch line connections, 151, 152, and 153. The line 153 has a one-way check valve 154 through which fluid passes from the line 150 to the port 155 and chamber 156. Since the pressure in this chamber will be substantially equal to the hydraulic pressure in chamber 157 at the other end of the valve when the tracer valve is closed, the hydraulic pressure on both ends of the valve is substantially equal, and thus the spring 146 provides the extra force for holding the plunger 81 to the left. When the tracer valve is closed, the hydraulic pressure throughout this system supplied by the pump 139 will be substantially equal because there is no flow in the system.

Now, when the tracer valve opens, and due to the high resistance at the port 136, the hydraulic fluid will be immediately drawn off from the lines 135 and 150 and especially through the open line 151 so that the hydraulic pressures on opposite ends of the plunger 81 become unbalanced, and the plunger immediately shifts to the right, and it will go all the way until it hits the other end of the valve housing. This will immediately fully open the port 136 so that the full flow of the pump 139 becomes available to replenish the drop in pressure in line 135. At the same time, another spool 158 on the plunger moves towards the right and throttles the flow from port 78 to port 82, thereby causing a drop in pressure in the chamber 118 of the balancing valves whereby the plungers 88 and 91 will shift toward one another and thereby slows down the prevailing feed rate or stop it. The spool 158 will simultaneously establish a connection from port 78 to port 159 which is connected by a hydraulic resistance 160 to channel 83. This insures that some degree of pressure is always maintained in the line 83. A hydraulic resistance 161 may be connected in parallel with the check valve 154 to prevent sudden fluctuations in pressure in the chamber 156.

It will now be seen that the control valve 79 is automatically adjustable in accordance with the demand for fluid by the tracer valve to automatically slow down or block the feed rate and that the valve plunger 81 is subject to much greater physical movement than the tracer valve, and therefore can be made very effective in stopping the feed rate, in response to large deflections of the tracer.

In the modification of the invention shown in Figure 3, automatic control valves similar to the valve 79, shown in Figure 1, and comprising the valves 162 and 163 are connected in the motor lines 164 and 165 leading from the tracer valve 10 which is of the same construction as the tracer valve shown in Figure 1. In this case, the pressure ports 15 and 16 of the tracer valve are directly connected to the pump 139.

The motor line 164 is connected to the chamber 166 of the valve 162 for exerting pressure on the valve plunger 167 in a direction to open port 168 whereby the fluid pressure will continue through line 169 to the hydraulic motor 21. The pressure existing in the line 169 is connected to the other end chamber 170 of valve 162 in a similar manner as described for the valve 79, and a spring 171 provides the extra biasing force on plunger 167 to nearly close the port 168 when there is no flow, that is, when the tracer valve is closed. The other motor channel 165 is connected to valve 163 in a similar manner to control the movements of the valve plunger 172. The fluid pressure for supplying the chamber 118 of the balancing valves is derived from the pump 75 but the fluid pressure for this purpose is connected serially through both of the valves 162 and 163.

In other words, the valve 162 has a port 173 connected by channel 174 to the pump 75. This port is connectible to port 175 by the annular groove 176 in valve plunger 167, and the port 175 is connected by channel 177 to port 178 of valve 163 and thereby through the annular groove 179 in plunger 172 to port 180. The port 180 is connected by channel 181 to the throttle valve 119 and thereby to chamber 118 in a manner similar to that shown in Figure 1. It will now be seen that if the tracer valve shifts in such a direction to connect pressure to channel 164, and to connect channel 165 to exhaust or reservoir, that the plunger 172 in valve 163 will shift to the right, thereby opening the port 178 while the plunger 167 in valve 162 will be shifted to the left to reduce the flow through port 173 and thereby reduce the feed rate. Check valves 181' and 182' are provided so that the return flow from the hydraulic motor may pass from the motor to either channel 164 or 165, depending on conditions, without the necessity of passing through the end of the respective control valves. The distinction between this construction and that shown in Figure 1 is that the control valve 79 operates in response to a drop in pressure in line 135 whereas the control valves shown in Figure 3 operate on a rise in pressure in either line 164 or 165, but it will be obvious that both are responsive to opening of the tracer valve.

There has thus been provided a new and improved tracer control circuit which is automatically operable to obtain a better control in the proportioning of feed rates of the two slides, and an automatic control is provided for reducing the feed rate whenever a change in direction is effected. It is to be noted that since the signal for this purpose is from the tracer valve, the reduction in feed rate will be instituted momentarily before the change in direction has been instituted whereby the feed rate will be lower at the time the change in direction is effected.

What is claimed is:

1. In a tracer control circuit for governing operation of hydraulic motors of a pattern controlled machine, the combination of a tracer valve having a neutral position, a first settable control means in said circuit for determining the proportional rate of operation of said motors and thereby a resultant feed rate, a second means in said circuit operative to reduce said resultant feed rate while maintaining proportional operation of said motors, and operative control connections connecting said tracer valve to each of said means to render said means sequentially operative upon movement of the tracer valve from its neutral position to cause said second-named means to become effective prior to said first-named means becoming effective.

2. In a tracer controlled circuit for governing operation of two hydraulic motors of a pattern controlled machine, the combination of a tracer valve having a neutral position, a first settable control means in said circuit operatively connected to said motors for determining the proportional rate of operation thereof and thereby a resultant feed rate, a second means in said circuit operative to reduce said resultant feed rate while maintaining proportional operation of said motors, and operative control connections connecting said tracer valve to each of said means to render said means sequentially operative upon movement of the tracer valve from its neutral position to cause said second-named means to become effective prior to said first-named means.

3. In a tracer control circuit for governing operation of two hydraulic motors of a pattern controlled machine, the combination of a tracer valve having a neutral position, a first settable control means in said circuit for determining the proportional rate of operation of said two motors and thereby the resultant feed rate effected thereby, a second means in said circuit operative upon said first-named means to reduce said resultant feed rate while maintaining said proportion, and operative control connections connecting said tracer valve to each of said means to render said means sequentially operative upon movement of the tracer valve from its neutral position to reduce the resultant feed rate before changing the setting of said first-named control means.

4. In a tracer control circuit for governing operation of two hydraulic motors of a pattern controlled machine, the combination of a tracer valve having a neutral position and operative positions on either side thereof, a first settable control means in said circuit for determining the proportional rate of operation of said motors and thereby a resultant feed rate, a second means in said circuit operatively connected to said first-named means and settable to determine the rate of said resultant feed rate without disturbing the proportional rate of operation of said motors, and operative control connections connecting said tracer valve for sequential operation of said means upon movement of the tracer valve to one of its operative positions to cause said second-named means to change said resultant feed rate prior to said first-named means becoming effective.

5. In a tracer controlled circuit for governing operation of a hydraulic motor of a pattern controlled machine, the combination of rate valve means to control the rate of operation of said motor, a hydraulic balancing valve means creating a pressure drop in said circuit between the motor and the rate valve means to maintain a predetermined constant pressure drop across the rate valve whereby variation in the position of the rate valve plunger will vary the rate in accordance with linear movement of the valve plunger, and tracer control means effective on said hydraulic balancing means to increase independently the pressure drop caused by said balancing means and thereby decrease the rate of operation of said motor independent of said rate valve means.

6. In a tracer controlled circuit for governing operation of two hydraulic motors of a pattern controlled machine, the combination of individual rate valves operatively connected to the respecive motors to control the rate of operation of each and thereby the resultant direction of feed in the machine, a balancing valve mechanism connected between the motors and the rate valves to create a pressure drop in the flow from the motors to the rate valves to maintain a predetermined constant pressure drop across each rate valve and thereby establish a proportional rate of operation of said motors, and tracer control means hydraulically effective on said balancing valves for independently changing the pressure drop produced by said balancing valves to change the resultant feed rate produced by said motors while maintaining their proportional rates of operation.

7. In a tracer control circuit for governing operation of two hydraulic motors of a pattern controlled machine, which motors determine the nature of the cutting path produced in said machine, the combination of a rate valve for each of said motors, a reversing valve hydraulically connecting each motor to its rate valve, hydraulic balancing valve means serially connected between the reversing valves and the rate valves to create a pressure drop in the flow from each reversing valve to its respective rate valve to establish and maintain a predetermined pressure drop across the rate valves to maintain a proportional rate of operation of said motors, and tracer control means effective on said balancing valve means to shift them independently of the rate valves to change the rate of operation of each motor without disturbing their proportional rate of operation.

8. In a tracer controlled circuit for governing operation of two hydraulic motors of a pattern controlled machine, the combination of a tracer valve having a neutral position and operative positions on either side thereof, a reversing valve operatively connected to each motor, a settable rate valve hydraulically connected to each reversing valve, means for simultaneously determining the setting of said reversing valves and said rate valves, said means being operatively connected to said tracer valve for actuation in response to movement of the tracer from its neutral position, balancing valve means serially connected between said reversing valves and said rate valves for maintaining a constant pressure drop across said rate valves, constant hydraulic pressure means for determining the position of said balancing valve means and thereby the pressure drop to be created across said rate valves, and means responsive to movement of the tracer from its neutral position to change said constant pressure.

9. In a tracer control circuit for governing operation of the hydraulic motors of a pattern controlled machine, the combination of a tracer controlled valve having a neutral position and operative positions on either side thereof, a rate valve hydraulically connected in series with each motor, balancing valve means in said serial connections to establish and maintain a constant pressure drop across said rate valves, a source of pressure adjustable to determine the position of said balancing valves and thereby the resultant rate of feed produced by said motors, a blocking valve in said pressure line and means responsive to movement of the tracer valve to an operative position to close said valve and thereby change the position of said balancing valves.

10. In a tracer control circuit for governing operation of two hydraulic motors of a pattern controlled machine, the combination of a tracer valve having a neutral position and operative positions on either side thereof, rotatable cam means for simultaneously determining the setting of said reversing valves and said rate valves and thereby the proportional rate of operation of said motors, power operable means controlled by the tracer valve for driving said cams, balancing valve means serially connected between said reversing valves and said rate valves for maintaining a constant pressure drop across said rate valves, a source of controllable pressure for balancing the position of said balancing valve means against the pressure on the downstream side of said balancing valves, and means responsive to initial movement of the tracer from its neutral position to reduce said controllable pressure.

11. In a tracer control circuit for governing operation of two hydraulic motors of a pattern controlled machine, the combination of a tracer valve having a neutral position and operative positions on either side thereof, independent valve means for determining the rate and the direction of operation of said motors, independent cam means for setting the position of said valves, one of said cam means effecting gradual positioning of the rate valves, and the other cam means intermittently shifting the direction valves from one extreme position to the other, a drive shaft for rotating said cam means and a hydraulic motor rotatable in response to opening of said tracer valve and operatively connected to rotate said shaft.

12. In a tracer controlled circuit for governing operation of two hydraulic motors of a pattern controlled machine, the combination of independent reversing valves for said motors, independent rate valves for said motors hydraulically serially connected to said reversing valves, a first cam means for positioning said reversing valves to determine the quadrant of operation, a second cam means operative on said rate valves to determine the resultant feed rate in said quadrant, a tracer valve and a hydraulic motor controlled by said tracer valve for simultaneously rotating said cam means.

13. In a tracer controlled circuit for governing operation of two hydraulic motors of a pattern controlled machine, the combination of independent reversing valves for said motors, independent rate valves for said motors hydraulically serially connected to said reversing valves, a first cam means for positioning said reversing valves to determine the quadrant of operation, a second cam means operative on said rate valves to determine the resultant feed rate in said quadrant, a tracer valve, a hydraulic motor controlled by said tracer valve for simultaneously rotating said cam means, and means to change the flow capacity of said rate valves to obtain a series of low rates or fast rates.

14. In a tracer controlled circuit for governing operation of two hydraulic motors of a pattern controlled machine, the combination of independent reversing valves for said motors, independent rate valves for said motors hydraulically serially connected to said reversing valves, a first cam means for positioning said reversing valves to determine the quadrant of operation, a second cam means operative on said rate valves to determine the resultant feed rate in said quadrant, a tracer valve, a hydraulic motor controlled by said tracer valve for simultaneously rotating said cam means, means to change the flow capacity of said rate valves to obtain a series of low rates or fast rates, and a selector valve for choosing between the two series of rates.

15. In a machine tool having a hydraulic motor and a source of pressure to effect actuation thereof, the combination of means in the return line from said motor for controlling its rate of operation including valve means for throttling the discharge flow from said motor, fluid pressure means for shifting said valve means to decrease said flow, a pilot line having serial resistances therein and connected to said source of pressure for receiving a continuous flow therefrom to establish a predetermined pressure between said resistances, means connecting said predetermined pressure to said valve means in opposition to said fluid pressure means to balance the position of said valve whereby the return flow from said motor is proportioned to the flow in said pilot line, means to vary one of said resistances to vary said motor return flow in proportion to the variation in flow in the pilot line and automatic throttle means in said pilot line alternatively operative to vary the flow in said pilot line and thereby the return flow from said motor.

References Cited in the file of this patent

UNITED STATES PATENTS

| | | |
|---|---|---|
| 1,999,787 | Sassen | Apr. 30, 1935 |
| 2,332,533 | Roehm | Oct. 26, 1943 |

FOREIGN PATENTS

| | | |
|---|---|---|
| 448,337 | Great Britain | June 5, 1936 |